(12) United States Patent
Passaniti et al.

(10) Patent No.: US 11,187,563 B2
(45) Date of Patent: Nov. 30, 2021

(54) METHOD OF DETECTING FLUID FLOWS, CORRESPONDING DEVICE AND COMPUTER PROGRAM PRODUCT

(71) Applicant: STMicroelectronics S.r.l., Agrate Brianza (IT)

(72) Inventors: Fabio Passaniti, Syracuse (IT); Enrico Rosario Alessi, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 337 days.

(21) Appl. No.: 16/227,368

(22) Filed: Dec. 20, 2018

(65) Prior Publication Data
US 2019/0212177 A1 Jul. 11, 2019

(30) Foreign Application Priority Data
Jan. 9, 2018 (IT) .................. 102018000000629

(51) Int. Cl.
| | |
|---|---|
| *G01F 1/72* | (2006.01) |
| *G01M 3/28* | (2006.01) |
| *G01F 1/36* | (2006.01) |
| *G01N 29/02* | (2006.01) |
| *G01M 3/26* | (2006.01) |

(Continued)

(52) U.S. Cl.
CPC .................. *G01F 1/72* (2013.01); *G01F 1/36* (2013.01); *G01M 3/20* (2013.01); *G01M 3/26* (2013.01); *G01M 3/28* (2013.01); *G01N 29/02* (2013.01); *G01P 5/22* (2013.01); *G01P 13/045* (2013.01)

(58) Field of Classification Search
CPC .. G01F 1/36; G01F 1/72; G01M 3/20; G01M 3/26; G01M 3/28; G01N 29/02; G01P 13/045; G01P 5/22
See application file for complete search history.

(56) References Cited

U.S. PATENT DOCUMENTS

| | | | |
|---|---|---|---|
| 6,725,076 B1 * | 4/2004 | Jensen ...................... | G01P 5/22 367/89 |
| 6,859,659 B1 * | 2/2005 | Jensen ................ | G01S 15/8984 342/108 |

(Continued)

FOREIGN PATENT DOCUMENTS

| | | |
|---|---|---|
| CN | 1784594 A | 6/2006 |
| CN | 103109311 A | 5/2013 |

(Continued)

*Primary Examiner* — Roy Y Yi
*Assistant Examiner* — Geoffrey T Evans
(74) *Attorney, Agent, or Firm* — Slater Matsil, LLP (57) ABSTRACT

A method includes: receiving, from a plurality of sensors, detection signals indicative of fluid flow, the fluid flow having a direction and a speed, the plurality of sensors having respective mutual positions and distances between pairs of sensors in the plurality of sensors; determining, as a function of the detection signals, a first detection sensor in the plurality of sensors detecting the fluid flow prior to other sensors in the plurality of sensors; determining time delays between detection of the fluid flow by a first sensor and by a second sensor in each pair of sensors in the plurality of sensors; and determining a fluid flow velocity vector indicative of the direction and the speed of the fluid flow as a function of the mutual positions and distances between the pairs of sensors in the plurality of sensors and the time delays.

20 Claims, 8 Drawing Sheets

(51) Int. Cl.
  *G01P 5/22* (2006.01)
  *G01P 13/04* (2006.01)
  *G01M 3/20* (2006.01)

(56) References Cited

U.S. PATENT DOCUMENTS

| | | |
|---|---|---|
| 2003/0066359 A1 | 4/2003 | Gysling et al. |
| 2004/0226345 A1 | 11/2004 | McCoy et al. |
| 2011/0209541 A1 | 9/2011 | Rangwala et al. |
| 2014/0377877 A1 | 12/2014 | Burgi et al. |
| 2017/0102369 A1 | 4/2017 | Arunachalam |
| 2017/0350915 A1 | 12/2017 | Hoheisel |
| 2018/0031401 A1 | 2/2018 | Haffner et al. |

FOREIGN PATENT DOCUMENTS

| | | |
|---|---|---|
| CN | 104237456 A | 12/2014 |
| CN | 107209203 A | 9/2017 |
| EP | 3133402 A1 | 2/2017 |
| WO | 0218884 A2 | 3/2002 |
| WO | 02077578 A1 | 10/2002 |

\* cited by examiner

METHOD OF DETECTING FLUID FLOWS, CORRESPONDING DEVICE AND COMPUTER PROGRAM PRODUCT

CROSS-REFERENCE TO RELATED APPLICATIONS

This application claims the benefit of Italian Application No. 102018000000629, filed on Jan. 9, 2018, which application is hereby incorporated herein by reference.

TECHNICAL FIELD

The description relates to systems and methods for detecting fluid flows (e.g. gas leak sources, for gases such as benzene, methane, ethanol or more volatile organic compounds), a corresponding device, and a computer program product.

BACKGROUND

Transport and use of dangerous gases is common e.g. in industrial settings as well as within homes, where gas service providers install pipes for transporting the gas to domestic gas systems. Also, volatile organic compounds may be emitted by vehicle engines, e.g. cars.

In many cases, transporting, storing and using a gas may involve risks of leakage.

Accordingly, limit values are defined by the Federal Institute for Occupational safety and Health in order to prevent harm to employees, e.g. by preventing them from breathing in a higher gas concentration than the stated threshold limit value, throughout their entire working lives.

For example, the limit value for propane and butane is set at 1000 ppm. An indicator that has been introduced is the LC50, where LC stands for lethal concentration, while 50 reflects the gas concentration in air that kills 50% of laboratory animals when inhaled for a certain period of time (typically four hours). For example LC50 may be in a range between 0.5 to 2.0 g/m3 for acetonitrile, ammonia, benzene, carbon disulfide, carbon monoxide, chlorine, cyanogen, hydrogen chloride, methanol, methyl bromide, sulfur dioxide.

Conventionally, leaks are detected manually by using portable sensor devices that aim at detecting a leakage origin. Recent methods are also based on pressure drop monitoring in a pipe itself.

A number of automated gas leak detection systems have been proposed, based e.g. on a series of gas sensors spatially distributed and monitoring the sensed concentration in time.

However, these solutions may present one or more drawbacks, e.g. they need a pre-installation and can be expensive for distributing sensors in the environment and reading out those remotely. Also, this solution may be hardly suitable for home and/or vehicle (e.g. car) settings.

SUMMARY

An object of one or more embodiments may be that of providing a gas leak source detector module for handled, mobile and wearable devices able to identify presence, flow velocity and source of gas leaks.

Advantages of one or more embodiments may include providing an accurate, low-power, low-latency gas leak source detector module; that is, one or more embodiments may be implemented with attributes of low power and low latency in order to be suitable for the applicative context.

One or more embodiments may include a corresponding device (e.g. a portable device or a vehicle including gas sensors and a processing unit for performing the method according to one or more embodiments), as well as a computer program product loadable in the memory of at least one processing module (e.g., processing unit of a mobile phone and/or a vehicle) and including software code portions for executing the steps of the method when the product is run on at least one processing module. As used herein, reference to such a computer program product is understood as being equivalent to reference to a computer-readable memory containing instructions for controlling the processing system in order to co-ordinate implementation of the method according to one or more embodiments. Reference to "at least one computer" is intended to highlight the possibility for one or more embodiments to be implemented in modular and/or distributed form.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may relate to a gas module for a portable device such as a mobile phone, handled device or wearable device, which may be used for air quality detection in user contexts like homes and general indoor environments, cars and general vehicle cockpits.

One or more embodiments may be applied to the field of environmental sensors in the consumer, automotive, industrial and medical markets.

Figures 1A, 1B:
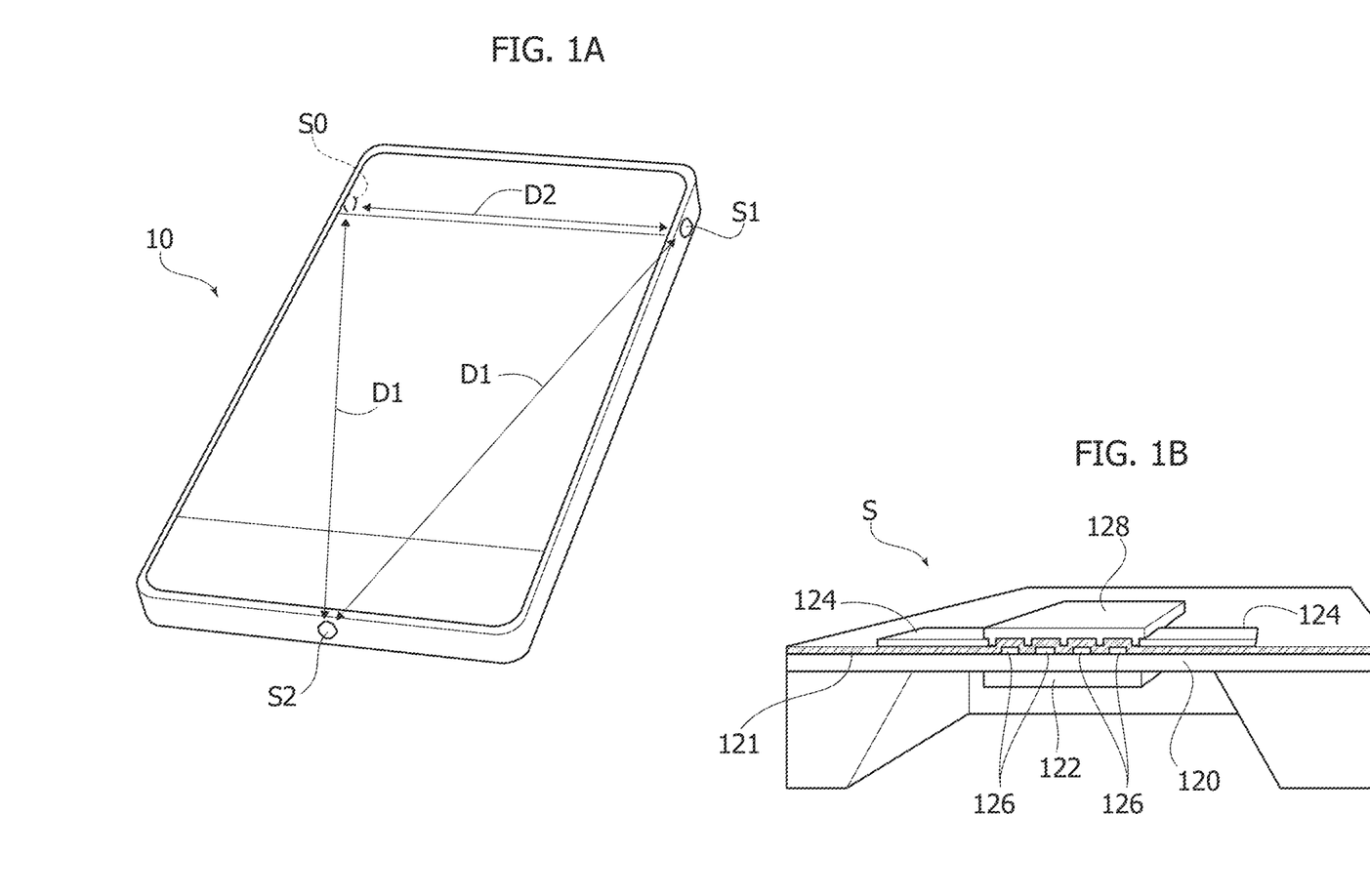
FIGS. 1A and 1B represent a non-limiting example of a device and a sensor, respectively, according to one or more embodiments.

FIG. 1A exemplifies a possible implementation of a device 10 according to one or more embodiments. For example, as illustrated in the non-limiting example of FIG. 1A, it may be possible to include a gas leak source detector module in a mobile phone.

In the illustrated embodiment, a number of sensors S, e.g. three gas sensors S0, S1, S2 (e.g. gas concentration sensors) may be included into the device 10, however it may be possible to provide more than three sensors in the device 10. For example, increasing the number of sensors S in the device 10 may enhance spatial resolution.

In one or more embodiments, the sensors may be placed on outer surfaces of the device 10, e.g. on the lateral surfaces thereof. For example, the sensors S may be placed at edges of the device 10, optionally at corners thereof.

Also, the sensors S may be placed around a central position and may lie at certain distances from one another, which may be the same for each pair of neighboring sensors or may be different, e.g. a first distance D1 between sensors S0-S2 and S1-S2 and a second distance D2 between sensors S0-S1 in FIG. 1A.

For example, the gas sensors S may be installed at the edges of a portable device, e.g. a mobile phone, having a triangular disposition in case of three sensors, quadrilateral disposition in case of four sensors, and so on.

In the illustrated embodiment of FIG. 1A, the device 10 may have a parallelepiped shape and the sensors S may be placed, in a triangular arrangement, on the lateral surfaces thereof, e.g.: a first sensor S0 may be placed at an end of a first lateral surface, e.g. at a first corner of the device 10; a second sensor S1 may be placed at an end of a second lateral surface, opposite to the first lateral surface, e.g. placed specularly reflective with respect to the first sensor S0; and a third sensor S2 may be placed in the center of a third lateral surface, the third lateral surface connecting the first and second lateral surfaces, preferably at the opposite ends with respect to the ends including the first S0 and second S1 sensors.

FIG. 1B represents a possible implementation of a gas sensor S, e.g. a gas concentration sensor, according to one or more embodiments.

The sensors S may be gas sensing elements in MOX (metal oxide) technology. The sensors S may include: a membrane 120, a thermal insulator 121, a silicon substrate 122, electrodes 124, a heater 126, and a metal oxide 128.

According to one or more embodiments, a number of blocks may be provided in the device 10 for sensing, i.e. detecting e.g. a fluid flow or gas leak, via sensors S.

Figure 2:
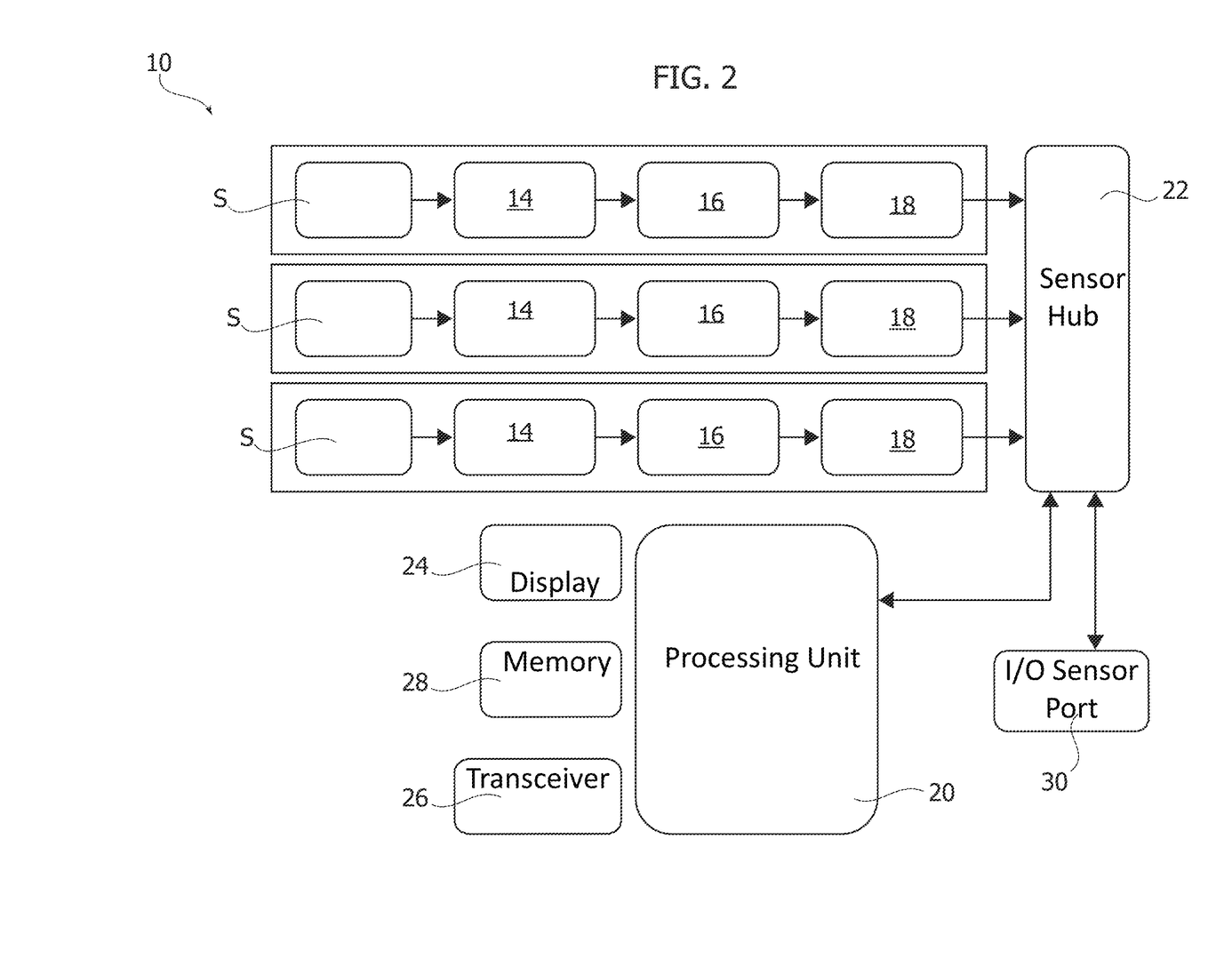
FIG. 2 exemplifies a block diagram of features of a device according to one or more embodiments.

In one or more embodiments, the sensor signals received from the sensors S may undergo processing, in corresponding processing blocks that may be set between each sensor S and a processing unit 20 of the device 10. For example, as shown in FIG. 2, the device 10, e.g. a mobile communication equipment, may include one or more of: an analog front end (AFE) 14, configured for amplifying the sensor signal, e.g. the gas sensing signal, an analog-to-digital converter 16, and/or a digital control block 18, configured for gas sensor setting and control, data conversion in ppm—parts per million—and for communicating with the processing unit 20, e.g. directly or through a sensor hub 22.

The sensor hub 22 may interface and manage gas sensors S and possibly other sensors which may be present in the portable device 10 (e.g. a mobile phone).

The processing unit 20 may include a central processing unit CPU, and the CPU 20 may be a main host processor or secondary processor and may be configured for elaborating the (gas) sensor signals, in order to detect a presence, a flow velocity and a direction of a gas. In other words, the CPU 20 may include a computational system for the detection of a fluid flow velocity and source.

Also, the CPU 20 may further compensate (gas) sensor signals in temperature and relative humidity, in a manner known in the art, if the received sensors signals are not already compensated. It will be appreciated that primitive temperature and humidity data may be collected by additional sensors placed on the (e.g. portable) device 10.

The CPU 20 may use the sensor hub 22 to communicate with and control the gas sensors S, also the processing unit 20 may receive and process sensor signals in order to detect the presence of a fluid flow, and the velocity and direction thereof.

Also, the device 10 may include a display 24, connected to the processing unit 20, configured for showing alarms, e.g. a gas flow concentration or a detected variation in the intensity of the gas flow.

Also, the device 10 may include a transceiver 26, e.g. a Bluetooth low energy (BTLE) block, configured for transferring primitive data or results to further devices, e.g. remote displays/systems/terminals. For example, the transceiver 26 may be configured to transmit also to a remote display the data transmitted to the display 24.

Furthermore, the device 10 may include a Random Access Memory (RAM) 28, and an Input/Output sensor port 30.

One or more of the previously exemplified blocks, e.g. the gas sensor(s) S, analog first end 14, analog to digital converter 16 and the digital control block 18, suitable for this kind of application, may have one or more of the following features: volatile organic compound (VOC) detection, an operating range of about 0-100 ppm, a limit of detection of about 1 ppm, power down mode consumption of few $\mu A$ (1 $\mu A=10^{-6}$ A), a warm-up mode for stabilizing the sensor, low and high power mode with increase and decrease of sampling rate, standard communication protocol, e.g. SPI, I2C or I3C, interfaces towards the sensor hub, a supply voltage of about 1.7 to 3.6 V, and/or a temperature operating range of about −20° C. to 85° C.

An example of a gas sensing element plus analog front end may be represented by TGS8100 gas sensor, supplied by Figaro, 1-5-11 Senbanishi, Mino, Osaka 562-8505, JAPAN. This sensor may be able to detect the presence of carbon oxide, methane, butane, propane and other harmful gases.

Figure 3:
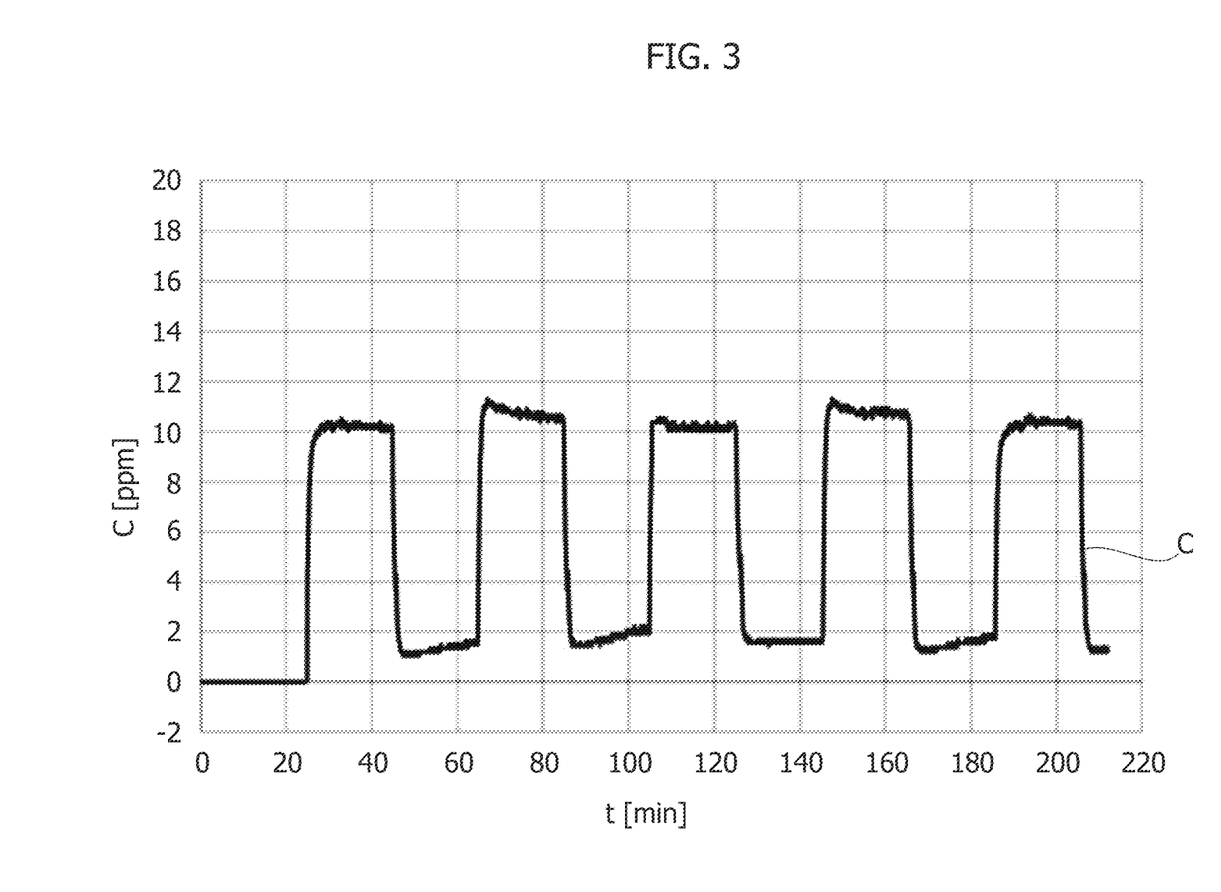
FIG. 3 represents a possible behavior in time of a signal from a sensor included in a device according to one or more embodiments.

FIG. 3 exemplifies an acquisition signal from a single gas sensor S (primitive data) in time t, in case the sensor S is immersed in a gas flow that changes a gas (e.g. toluene) concentration C between values of about 2 ppm to 10 ppm.

In the following figures, parts or elements like parts or elements already discussed in connection with FIGS. 1A to 3 are indicated with like references and a corresponding detailed description will not be repeated for the sake of brevity.

Figure 4A:
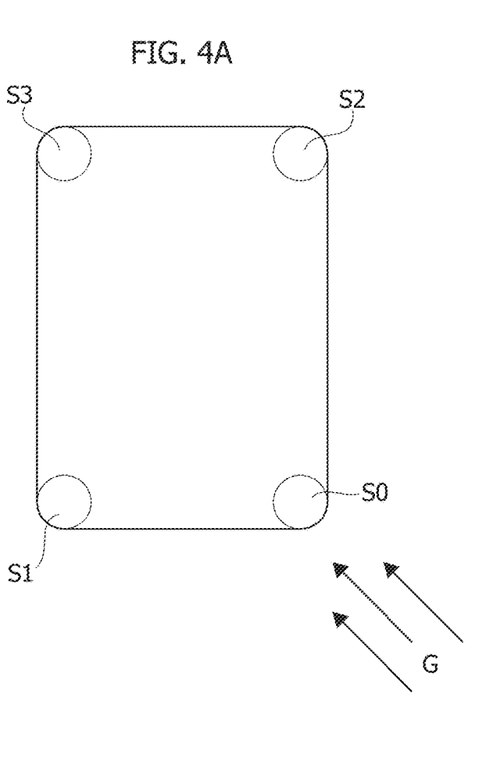
FIGS. 4A-4C exemplify features of one or more embodiments.

FIG. 4A exemplifies a possible front view of the device 10, herein represented as having a rectangular front surface, wherein an arrangement of four sensors, S0, S1, S2 and S3 may be included at the four corners of the device 10, e.g. on the lateral surfaces thereof.

For example, the four sensors may be placed each on a different lateral surface of the device 10, e.g. either at about the center of the respective lateral surface or in one corner thereof, or it may be possible to place the sensors onto two opposed lateral surfaces, at the edges thereof.

Figure 4B:
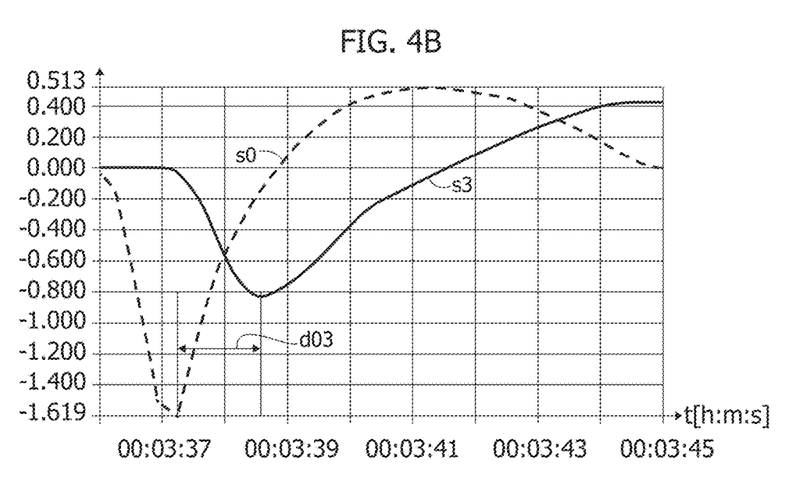

A gas flow G, in FIG. 4A represented by arrows, may be detected at different time instants by the sensors, e.g. FIG. 4B exemplifies sensor amplitude responses over time s0 and s3 for a first sensor S0 and a fourth sensor S3, respectively. Also, FIG. 4C exemplifies a time cross-correlation CC(0,3) between the sensor amplitude responses s0 and s3 of the first and fourth sensors S0 and S3, as a function of a time displacement d.

Figure 4C:
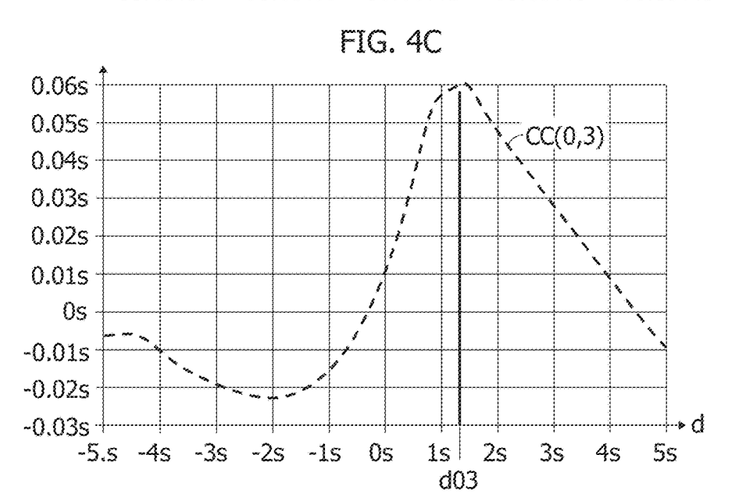

A cross-correlation CC(i,j) or s_i⊗s_j of i-th and j-th sensor signals s, at index n, may be defined as:

$$(s_i \otimes s_j)[n] = \sum_{m=-\infty}^{+\infty} s_i[m] \cdot s_j[m+n]$$

The cross-correlation signal may provide a measure of similarity of two signals si and sj as a function of their relative time displacement d (or lag time): an upper peak of the cross-correlation function along all the indexes n may indicate a point in time wherein the two signals may be considered as best aligned.

In the present non-limiting example, for the sensors S included in the device 10, a lower peak in the sensor data s may indicate a detection of the fluid flow G. Accordingly, in the illustrated example of FIGS. 4A-4C, the first sensor S0 may be the first, out of the four sensors S included in the device 10, to detect the gas flow G, and the corresponding sensor data s0 may show a lower peak which may occur, over time, before the lower peaks of the remaining sensor data s1, s2 and s3. In other words, the sensor which firstly (out of the sensors included into the device 10) detects the gas flow is also the sensor whose sensor data firstly exhibits a lower peak.

After the first sensor S0, in the present non-limiting example, the other sensors S1, S2 and S3 may detect the gas flow G, and delays or time displacements may be calculated between the instants at which the lower peaks are detected.

FIG. 4B exemplifies the relationship between sensors S0 and S3: a delay d03 exists between the lower peaks of the sensor data s0 and s3, with the delay d03 representing the time that may elapse between the detection of the gas flow G by sensor S0 (first) and sensor S3 (afterwards).

A respective cross-correlation CC(0,3) may be calculated between the sensor data s0 and s3 of the first and fourth sensors S0 and S3, which may exhibit a local upper peak at a time substantially corresponding to the detection delay d03.

Figure 5A:
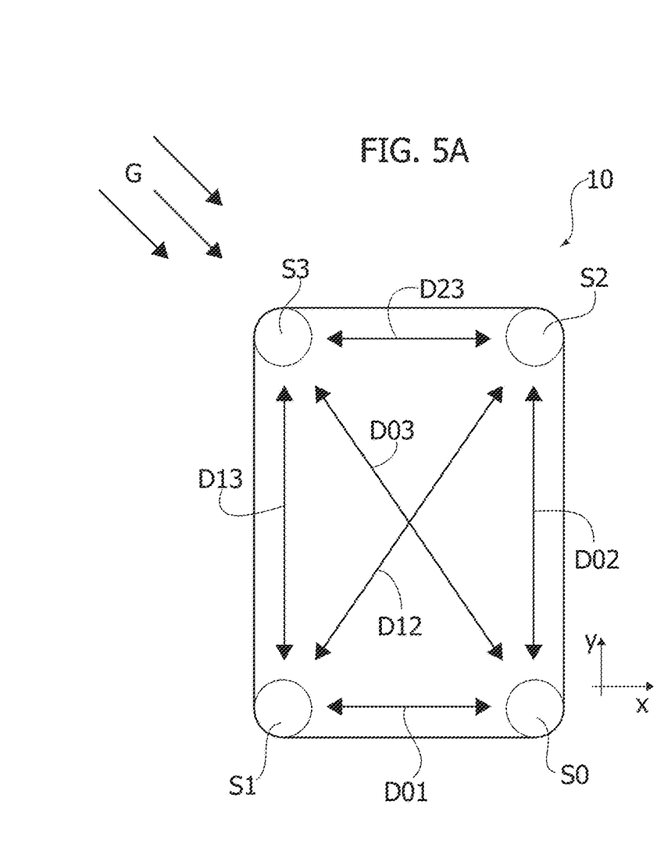
FIGS. 5A-5D exemplify features of one or more embodiments.
Figure 5B:
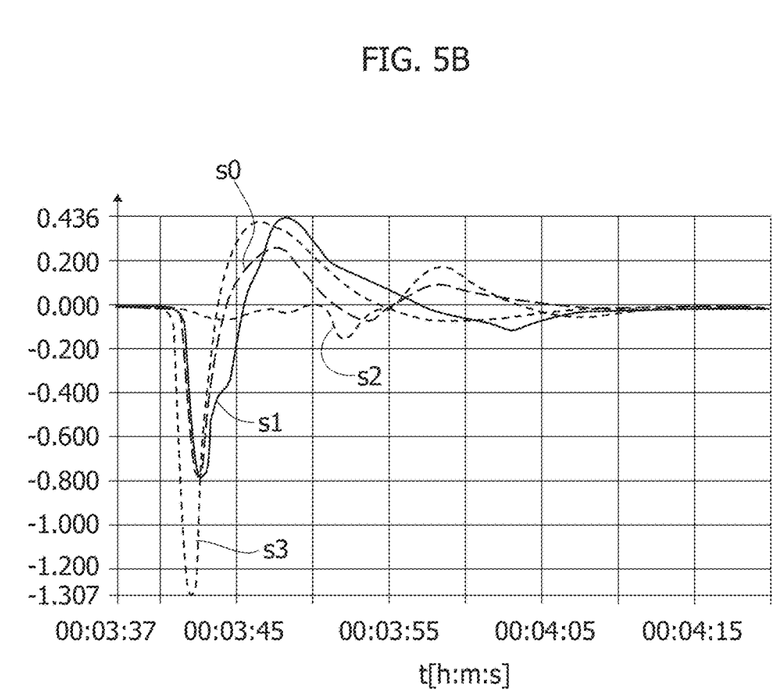
Figure 5C:
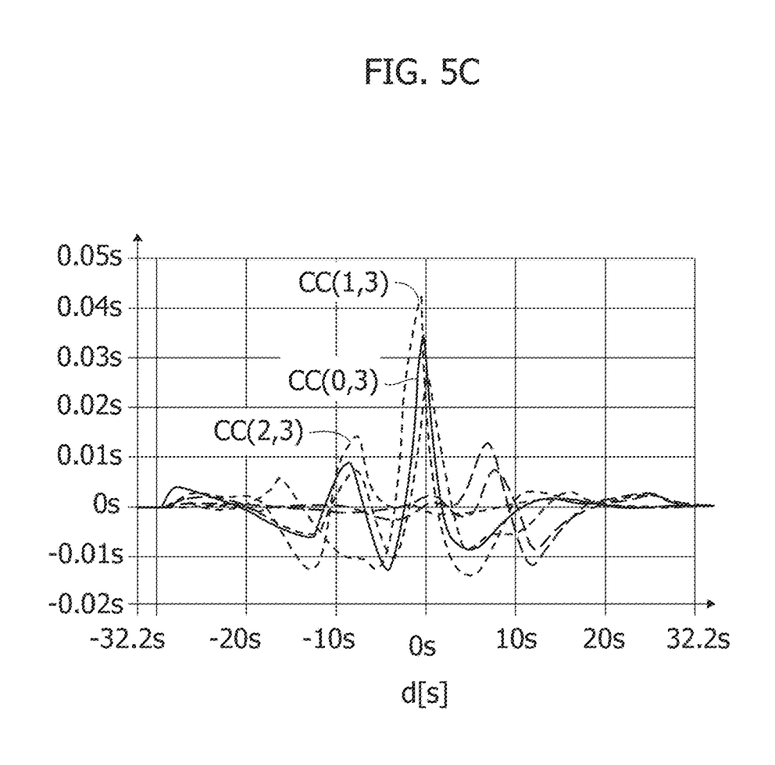
Figure 5D:
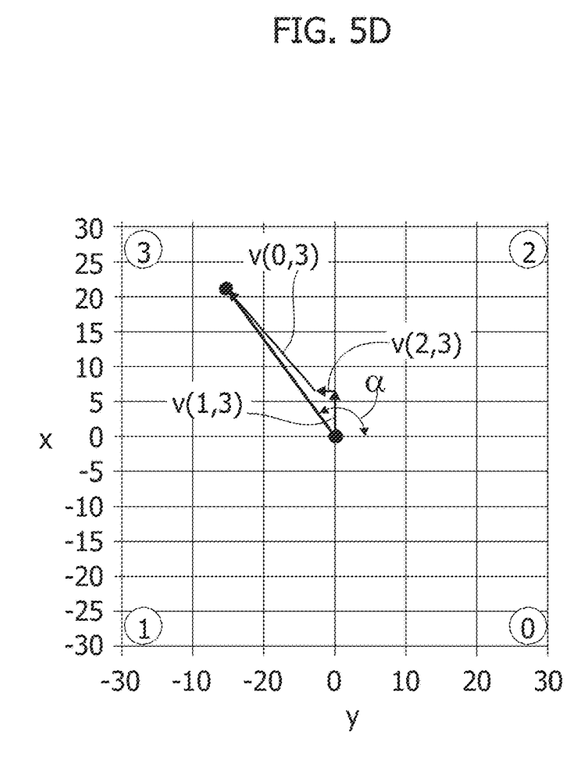

FIGS. 5A to 5D show possible features of one or more embodiments: FIG. 5A exemplifies a gas flow G detected by the sensors S0, S1, S2 and S3 arranged at the four corners of the device 10; FIG. 5B represents sensor data $s_i$ of each sensor $S_i$ included in the device 10; FIG. 5C exemplifies cross-correlation functions CC calculated as a function of the sensor data s illustrated in FIG. 5B; and FIG. 5D is indicative of an estimated fluid flow velocity vector g resulting from calculated lag times d, distances D between and positions of the sensors S.

It will be appreciated that, in the following description, reference will be made to vectors (e.g. fluid flow velocity vector g), having magnitude, direction and verse; however, for the sake of simplicity, vector notation will be omitted.

An arrangement as exemplified in FIG. 5A is again presented for the four sensors S0, S1, S2 and S3.

In the illustrated non-limiting example, the distances Dij between sensor i and sensor j may include: distances D01, D02, D13 and D23: 4 cm, and distances D12 and D03: 5.6 cm.

Again, sensor data s0, s1, s2 and s3 may be collected, represented as a function of time t in FIG. 5B.

In the present non-limiting example, the fourth sensor S3 may be the first (out of the sensors included in the device 10 in the present example) to detect the fluid e.g. gas flow G, followed by the remaining sensors S0, S1 and S2. Accordingly, the sensor data s3 corresponding to sensor S3 may include a lower peak which may anticipate in time (e.g. occur prior to) the lower peaks of the remaining collected sensor data, i.e. s0, s1 and s2 corresponding to the remaining sensors S0, S1 and S2 included in the device 10.

Cross correlation functions CC(i,j), illustrated in FIG. 5C, may be calculated as a function of pair of sensor signals $s_i$ and $s_j$: the cross-correlations CC(i,j) may show upper peaks at specific lag times $d_{ij}$, which may be indicative of the time that elapses between the (lower) peaks of the considered pair of sensor data.

In one or more embodiments, the lag times $d_{ij}$ may be included in a lag time matrix, a square matrix having dimensions corresponding to the number of sensors of the device 10: each cell (i+1,j+1) of the lag time matrix may store a specific lag time $d_{ij}$. In one or more embodiments, the lag time matrix may be a skew-symmetric matrix having null diagonal elements, i.e. $d_{ii}=0$.

In the present example, only the cross-correlations CC(0, 3), CC(1,3) and CC(2,3), relative to the third sensor S3, may be used for calculating the gas flow velocity vector g, insofar as they relate to the sensor data s3 of the sensor that first (out of the sensors included in the device 10) detects the fluid flow event G.

In one or more embodiments, the fluid flow velocity vector g may be calculated through partial velocity vectors v(i,j) calculated between pairs of sensors Si and Sj. A direction of the partial velocity vector may be calculated as a function of the physical position of the sensors Si and Sj. For example, considering an x-y plane in the non-limiting example of FIG. 4A, the direction of the vectors v(0,1) and v(2,3) may be parallel to an x axis, the direction of the vectors v(0,2) and v(1,3) may be perpendicular to the x axis, and the direction of the vectors v(0,3) and v(1,2) may be at an angle, substantially 60°, with respect to the x axis. Furthermore, the sign of the corresponding lag time $d_{ij}$ may be indicative of the sign (verse) of the corresponding partial velocity vector v(i,j). Also, a modulus of the partial velocity vector, i.e. a speed module |v(i,j)|, may be calculated as:

$$|v(i,j)|=D_{ij}/|d_{ij}|$$

wherein $|d_{ij}|$ represents the absolute value of the lag time determined through the cross-correlation function CC(i,j), i.e. the time delay between the detection of the gas flow G by sensor Si and sensor Sj, and $D_{ij}$ represents the physical distance between sensors Si and Sj.

It will be appreciated that the smaller the lag time between two sensors is, the higher may be the corresponding magnitude of the partial velocity vector.

Considering the present non-limiting example, speed modules |v(i,j)| may be calculated via lag times dij of the cross-correlations CC(i,j) and distances Dij:

| CC(i, j) | dij | Dij | |v(i, j)| |
|---|---|---|---|
| CC(0, 1) | 0.37 s | 4 cm | 10.8 cm/s |
| CC(0, 2) | 7.5 s | 4 cm | 0.5 cm/s |
| CC(0, 3) | −0.37 s | 5.6 cm | 15.1 cm/s |
| CC(1, 2) | 7.12 s | 5.6 cm | 0.8 cm/s |
| CC(1, 3) | −0.62 s | 4 cm | 6.5 cm/s |
| CC(2, 3) | −7.75 s | 4 cm | 0.5 cm/s |

In one or more embodiments, only the partial velocity vectors relating to the sensor that, out of the sensors included in the device 10, detects first the gas flow G may be used for calculation of the gas flow velocity vector g. In the present non-limiting example, such partial velocity vectors may be calculated as a function of the cross-correlations CC(0,3), CC(1,3) and CC(2,3), insofar as they relate to the sensor S3 which firstly detects the fluid (e.g. gas) flow G. It will be appreciated that the resulting lag times d03, d13 and d23 are negative, insofar as the calculation for the cross correlation CC(i,j) is biased on the first sensor data $s_i$ out of the pair of sensor data $s_i$, $s_j$.

Therefore, in one or more embodiments, the partial velocity vectors v(i,j) may be calculated as a function of the cross-correlation functions CC(i,j), specifically the lag times $d_{ij}$ therebetween, and distances $D_{ij}$ between and positions of the sensors Si and Sj. In the present example, the partial velocity vectors v(0,3), v(1,3) and v(2,3), related to the sensor data s3 of the sensor S3 being the first to detect the gas flow G, may be used to calculate the fluid flow velocity vector g, as exemplified in FIG. 5D, e.g. by vectorially summing the partial velocity vectors. For example, the resulting fluid flow velocity vector g may have a magnitude |g| (flow speed) of about 20.9 cm/s and may be directed at an angle α of about 112° with respect to the x axis.

It will be appreciated that the result of such calculation is a vector which indicates the direction of arrival of the gas flow G. For instance, in the case exemplified in FIG. 5A, the flow G is shown with a direction of arrival at about 112° with respect to the x axis.

According to the non-limiting example of FIG. 5D, the center of the x-y plane represents the detection point of the fluid flow G (e.g. it represents the sensing device 10), the length of the fluid flow velocity vector g is indicative of the intensity of the vector, and the direction of the vector is indicative of the direction of arrival of the gas flow with the vector pointing from the center of the x-y plane towards the origin of the fluid flow G.

Figure 6:
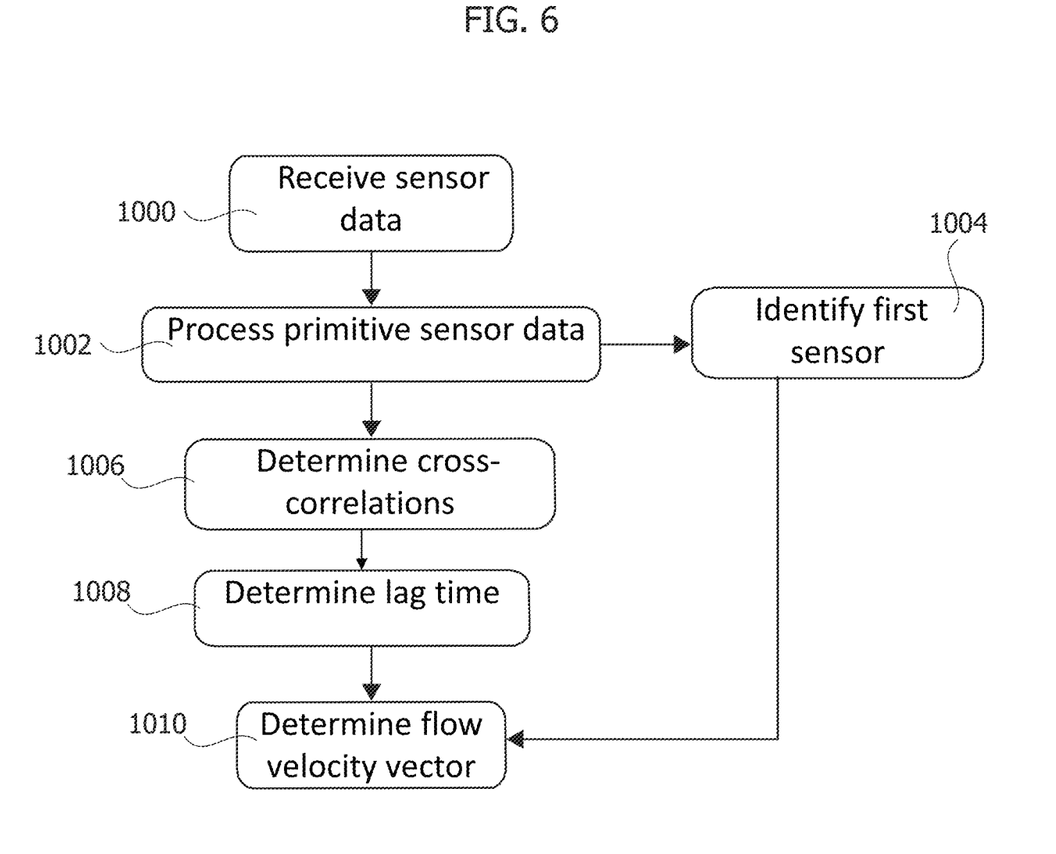
FIG. 6 exemplifies a flow chart of a method according to one or more embodiments.

The method according to one or more embodiments may be exemplified by FIG. 6. The method may include the steps of: step 1000 of receiving the sensor data from the sensors S in the device 10; step 1002 of processing the (primitive) sensor data s, e.g. it may be possible to perform data compression, baseline removal and/or high-frequency noise reduction; step 1004 of identifying a first sensor out of the sensors S that firstly detects a gas flow event G step 1006 of calculating cross-correlations CC between pairs of sensor data $s_i$, $s_j$ of pair of sensors Si, Sj; step 1008 of evaluating a lag time matrix; step 1010 of estimating a flow velocity vector g, based on the lag time d matrix, the first sensor and the distances D between the sensors S.

Figure 7A:
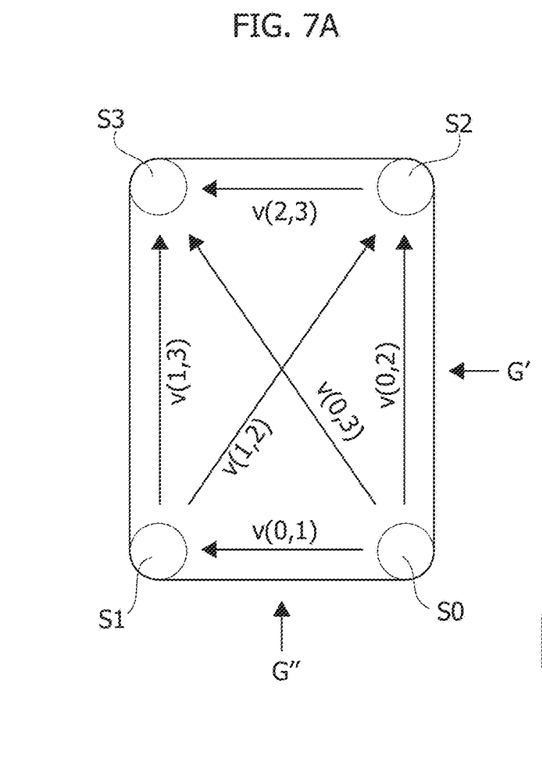
FIGS. 7A and 7B exemplify features and a flow chart of a method according to one or more embodiments, respectively.

In another non-limiting example, the fluid flow G may be perpendicular to one of the lateral surfaces of the device 10, e.g. fluid flow G' (substantially 0° with respect to the x axis) or G'' (substantially 90° with respect to the x axis) in FIG. 7A. Accordingly, two sensors may detect the fluid flow G at about the same time, e.g. sensor S0 plus either sensor S1 or sensor S2, respectively: e.g. a negligible lag time d01 or d02 may be calculated via the cross-correlations CC(0,1) and CC(0,2).

Figure 7B:
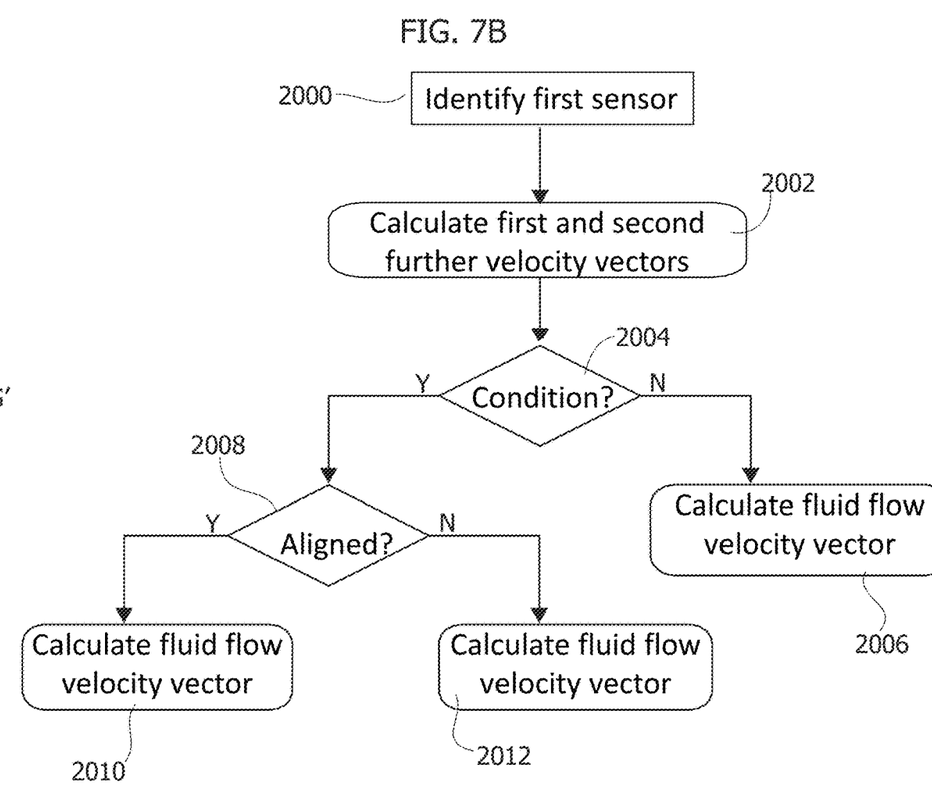

Thus, to estimate the fluid flow velocity vector g, the method according to one or more embodiments may include: step 2000 of identifying a first detection sensor (e.g. S0 in FIG. 7A) that first detects the fluid flow G and calculating partial velocity vectors v(i,j) as previously exemplified; step 2002 of calculating a first further velocity vector v' and a second further velocity vector v'', being a sum (with sign) of the partial velocity vectors that are perpendicular or parallel to the x axis and that include the first detection sensor (v'=v(0,1)+v(0,2)) and the sensor arranged opposite (e.g. the furthest, in the opposite corner, e.g. S3) from the first detection sensor (v''=v(1,3)+v(2,3)), respectively; step 2004 of detecting if a condition, wherein the first and second further velocity vectors are both aligned or perpendicular to the x axis, occurs; if the condition is absent (2004, N), step 2006 of calculating the fluid flow velocity vector g as a sum of the velocity vectors including the first detection sensor (e.g. g=v(0,1)+v(0,2)+v(0,3); if the condition is present (2004, Y), step 2008 of determining whether the first further velocity vector and the second further velocity vector are both aligned (i.e. parallel) to the x axis or perpendicular (e.g. aligned with the y axis) to the x axis; and if the first and second further velocity vectors are both perpendicular to the x axis (2008, N), step 2012 of calculating the fluid flow velocity vector g as a sum of the calculated partial velocity vectors discarding the partial velocity vectors vertically oriented—that is aligned perpendicularly with respect to the orientation of the first and second further velocity vectors (e.g. g=v(0,1)+v(0,3)+v(1,2) v(2,3)); if the first and second further velocity vectors are both aligned with the x axis (2008, Y), step 2010 of calculating the fluid flow velocity vector g as a sum of the calculated partial velocity vectors discarding the partial velocity vectors horizontally oriented—that is aligned to the first and second further velocity vectors (e.g. g=v(0,2)+v(0,3)+v(1,2) v(1,3)).

One or more embodiments may thus relate to a method which may include: receiving (e.g. step 1000), from a plurality of sensors (e.g. S0, S1, S2, S3); detection signals (e.g. s0, s1, s2, s3) indicative of a fluid flow (e.g. G) detected, the fluid flow having a direction and a speed, the sensors having respective mutual positions and distances (e.g. D01, D02, D03, D12, D13, D23) between pairs of sensors in the plurality of sensors, with the pairs of sensors including a first sensor and a second sensor in the pair, identifying (e.g. step 1004), as a function of the detection signals received, a first detection sensor in the plurality of sensors first detecting the fluid flow, calculating (e.g. step 1006) time delays (e.g. d01, d02, d03, d12, d13, d23) between detection of the fluid flow by the first sensor and by the second sensor in pairs of sensors in the plurality of sensors, e.g. the time that passes between detection of the fluid flow by the first detection sensor and detection of the fluid flow by other sensors in the plurality of sensors, and calculating (e.g. step 1010) a fluid flow velocity vector (e.g. fluid flow velocity vector g) indicative of the direction and speed of the detected fluid flow, as a function of the mutual positions and distances between pairs of sensors in the plurality of sensors and the calculated time delays.

One or more embodiments may include calculating the time delays by calculating time cross-correlations (e.g. CC(0,1), CC(0,2), CC(0,3), CC(1,2), CC(1,3), CC(2,3))

between the detection signals of the first detection sensor and of the other sensors in the plurality of sensors.

In one or more embodiments, the method may also include: providing the plurality of sensors in a matrix arrangement (e.g. a x-y plane) with sensors in the plurality of sensors aligned in the directions of the rows (e.g. parallel to the x axis) and the columns (e.g. parallel to the y axis) in the matrix arrangement, calculating (e.g. step 2002) a first further velocity vector including a sum—with sign—of partial velocity vectors calculated as a function of the mutual directions and distances plus calculated time delays, for pairs of sensors in the plurality of sensors aligned in the directions of the rows and the columns in the matrix arrangement and including the first detection sensor, wherein the first further velocity vector may include a first component in the direction of the rows and a second component in the direction of the columns in the matrix arrangement, respectively, comparing (e.g. step 2004) the first and second components of the first further velocity vector, and detecting a condition where the first resp. second component dominates over the second resp. first component (i.e. the magnitude of the second resp. first component is negligible with respect to the magnitude of the first resp. second component), which is indicative of the first further velocity vector being substantially aligned with the direction of the rows or with the direction of the columns in the matrix arrangement, and calculating (e.g. steps 2010, 2012) the fluid flow velocity vector by either of: a) absent detection of the condition, calculating the fluid flow velocity vector as a sum of partial velocity vectors calculated as a function of the mutual directions and distances plus calculated time delays for pairs of sensors in the plurality of sensors including the first detection sensor, b) as a result of the condition being detected, calculating the fluid flow velocity vector as a sum of partial velocity vectors calculated as a function of the mutual directions and distances plus calculated time delays, for (all) the pairs of sensors in the plurality of sensors by excluding from the sum partial velocity vectors calculated for pairs of sensors aligned in the direction of the first further velocity vector.

One or more embodiments may further include: identifying an opposite sensor in the plurality of sensors, the opposite sensor being the sensor in the plurality of sensors having the highest distance to the first detection sensor (i.e. it may be arranged in the opposite corner with respect thereto), calculating (e.g. step 2002) a second further velocity vector including a sum—with sign—of partial velocity vectors calculated as a function of the mutual directions and distances plus calculated time delays for pairs of sensors in the plurality of sensors aligned in the directions of the rows and the columns in the matrix arrangement and including the opposite sensor, wherein the second further velocity vector includes a first component in the direction of the rows and a second component in the direction of the columns in the matrix arrangement, respectively, comparing (e.g. step 2004) the first and second components of the first further velocity vector and the first and second components of the second further velocity vector, and detecting a condition where the first resp. second component dominates over the second resp. first component of the first further velocity vector plus the first resp. second component dominates over the second resp. first component of the second further velocity vector, the condition indicative of the first further velocity vector and the second further velocity vector being substantially aligned with the direction of the rows or with the direction of the columns in the matrix arrangement, and calculating (e.g. steps 2010, 2012) the fluid flow velocity vector by either of: a) absent detection of the condition, calculating the fluid flow velocity vector as a sum—with sign—of partial velocity vectors calculated as a function of the mutual directions and distances plus calculated time delays, for pairs of sensors in the plurality of sensors including the first detection sensor, b) as a result of the condition detected, calculating the fluid flow velocity vector as a sum—with sign—of partial velocity vectors calculated as a function of the mutual directions and distances plus calculated time delays for (all) the pairs of sensors in the plurality of sensors by excluding from the sum partial velocity vectors calculated for pairs of sensors aligned in the direction of the first and second further velocity vectors.

One or more embodiments may further include processing (e.g. 1002) the detection signals, by at least one of: filtering out high-frequency noise, and/or normalizing signal amplitudes, and/or removing signal baselines, and/or converting analog signals to digital signals.

One or more embodiments may also include transmitting to a display (e.g. to a local display 24 or to a remote display via a transceiver 26) of at least one user device (e.g. 10) at least one of: the fluid flow velocity vector, and/or the detections signals, and/or the calculated cross-correlations between the detection signals of pairs of sensors in the plurality of sensors, and/or the fluid flow being detected, and/or the modulus of the fluid flow velocity vector.

In one or more embodiments, identifying the first detection sensor in the plurality of sensors first detecting the fluid flow may include locating in time the occurrence of peaks in the detection signals from the plurality of sensors and identifying the first detection sensor peaks in the sensor data as the one producing the earliest peak occurring in the detection signals from the plurality of sensors.

One or more embodiments may also refer to a portable device (e.g. 10), for example a mobile communication equipment, which may include: a plurality of sensors, and a processing unit (e.g. 20), configured to perform the steps of the method according to one or more embodiments.

In one or more embodiments, the plurality of sensors may be arranged: surrounding a central portion of the device, and/or with each sensor of the plurality of sensors placed at a distance (e.g. D01, D02, D03, D12, D13, D23) from the neighboring sensors, and/or on lateral sides of the device, and/or at external edges of the device, preferably at the corners of the device.

Also, in one or more embodiments, the sensors in the plurality of sensors may include gas sensors, preferably metal oxide MOX gas sensors.

One or more embodiments may further relate to a computer program product loadable in the memory of at least one processing unit, and including software code portions for performing the steps of the method according to one or more embodiments.

Without prejudice to the underlying principles, the details and embodiments may vary, even significantly, with respect to what has been disclosed by way of example only, without departing from the extent of protection.

What is claimed is:

1. A method, comprising:
   receiving, from a plurality of gas sensors, detection signals indicative of a fluid flow along a major surface of a portable device, the plurality of gas sensors being spatially arranged on the portable device and being exposed to an outside environment, the fluid flow having a direction and a speed on the major surface, the plurality of gas sensors having respective mutual positions and distances between pairs of sensors in the plurality of gas sensors, the pairs of sensors comprising a first sensor and a second sensor;

determining, as a function of the detection signals, a first detection sensor in the plurality of gas sensors detecting the fluid flow prior to other sensors in the plurality of gas sensors;

determining time delays between detection of the fluid flow by the first sensor and by the second sensor in each pair of sensors in the plurality of gas sensors;

determining a fluid flow velocity vector indicative of the direction and the speed of the fluid flow as a function of the mutual positions and distances between the pairs of sensors in the plurality of gas sensors and the time delays; and based on the determined fluid flow velocity vector, determining a parameter of a gas flowing along the major surface of the portable device.

2. The method of claim 1, wherein determining the time delays comprises calculating time cross-correlations between the detection signals of the pairs of sensors in the plurality of gas sensors.

3. The method of claim 2, further comprising transmitting, to a display of a user device, at least one of the fluid flow velocity vector, the detections signals, or the time cross-correlations.

4. The method of claim 1, further comprising:

providing the plurality of gas sensors in a matrix arrangement with sensors in the plurality of gas sensors aligned in directions of rows and columns in the matrix arrangement;

determining a first further velocity vector comprising a sum of partial velocity vectors calculated as a function of the mutual positions and distances and the time delays for the pairs of sensors in the plurality of gas sensors aligned in the directions of the rows and the columns in the matrix arrangement and comprising the first detection sensor, wherein the first further velocity vector comprises a first component in the direction of the rows and a second component in the direction of the columns in the matrix arrangement, respectively; and comparing the first component and the second component of the first further velocity vector to detect a first condition where a first respective second component dominates over a second respective first component of the first further velocity vector, the first condition being indicative of whether the first further velocity vector is substantially aligned with the direction of the rows or with the direction of the columns in the matrix arrangement.

5. The method of claim 4, further comprising:

in response to a determination that the first condition is not satisfied, determining the fluid flow velocity vector by calculating a sum of partial velocity vectors calculated as a function of the mutual positions and distances and the time delays for the pairs of sensors in the plurality of gas sensors comprising the first detection sensor.

6. The method of claim 4, further comprising:

in response to a determination that the first condition is satisfied, determining the fluid flow velocity vector by calculating a sum of partial velocity vectors calculated, as a function of the mutual positions and distances and the time, for the pairs of sensors in the plurality of gas sensors by excluding from the sum partial velocity vectors calculated for pairs of sensors aligned in the direction of the first further velocity vector.

7. The method of claim 4, further comprising:

identifying an opposite sensor in the plurality of gas sensors, the opposite sensor being a sensor in the plurality of gas sensors having a highest distance to the first detection sensor;

determining a second further velocity vector comprising a sum of partial velocity vectors calculated as a function of the mutual positions and distances and the time delays for the pairs of sensors in the plurality of gas sensors aligned in the directions of the rows and the columns in the matrix arrangement and comprising the opposite sensor, wherein the second further velocity vector comprises a first component in the direction of the rows and a second component in the direction of the columns in the matrix arrangement, respectively; and comparing the first component and the second component of the first further velocity vector and the first component and the second component of the second further velocity vector to detect a second condition where a first respective second component of the first further velocity vector dominates over a second respective first component of the first further velocity vector and where a first respective second component of the second further velocity vector dominates over a second respective first component of the second further velocity vector, the second condition being indicative of whether the first further velocity vector and the second further velocity vector are substantially aligned with the direction of the rows or with the direction of the columns in the matrix arrangement.

8. The method of claim 7, further comprising:

in response to a determination that the second condition is not satisfied, determining the fluid flow velocity vector by calculating a sum of partial velocity vectors calculated as a function of the mutual positions and distances and the time delays for the pairs of sensors in the plurality of gas sensors comprising the first detection sensor.

9. The method of claim 7, further comprising:

in response to a determination that the second condition is satisfied, determining the fluid flow velocity vector by calculating as a sum of partial velocity vectors calculated as a function of the mutual positions and distances and the time delays for the pairs of sensors in the plurality of gas sensors by excluding from the sum partial velocity vectors calculated for pairs of sensors aligned in the direction of the first further velocity vector and the second further velocity vector.

10. The method of claim 1, further comprising processing the detection signals by at least one of filtering out high-frequency noise, normalizing signal amplitudes, removing signal baselines, or converting analog signals to digital signals.

11. The method of claim 1, further comprising transmitting, to a display, at least one of a concentration of a gas comprised in the fluid flow or a variation over time in a modulus of the fluid flow velocity vector.

12. The method of claim 1, wherein determining the first detection sensor in the plurality of gas sensors comprises locating, in time, an occurrence of peaks in the detection signals from the plurality of gas sensors and identifying the first detection sensor as the sensor producing the earliest peak occurring in the detection signals from the plurality of gas sensors.

13. A portable device, comprising:
a plurality of gas sensors; and
a processing unit configured to:
receive, from the plurality of gas sensors, detection signals indicative of fluid flow_ along a major surface of the portable device, the plurality of gas sensors being spatially arranged on the portable device and being exposed to an outside environment, the fluid flow having a direction and a speed, the plurality of gas sensors having respective mutual positions and distances between pairs of sensors in the plurality of gas sensors, the pairs of sensors comprising a first sensor and a second sensor in the pair of sensors;
determine, as a function of the detection signals, a first detection sensor in the plurality of gas sensors detecting the fluid flow prior to other sensors in the plurality of gas sensors;
determine time delays between detection of the fluid flow by the first sensor and by the second sensor in each pair of sensors in the plurality of gas sensors;
determine a fluid flow velocity vector indicative of the direction and the speed of the fluid flow as a function of the mutual positions and distances between the pairs of sensors in the plurality of gas sensors and the time delays; and
based on the determined fluid flow velocity vector, determine a parameter of a gas flowing along the major surface of the portable device.

14. The portable device of claim 13, wherein the portable device comprises a mobile communication device.

15. The portable device of claim 13, wherein a spatial arrangement of the plurality of gas sensors comprises at least one of the plurality of gas sensors surrounding a central portion of the portable device, each sensor of the plurality of gas sensors being placed at a distance from neighboring sensors, the plurality of gas sensors being disposed on lateral sides of the portable device, or the plurality of gas sensors being disposed at external edges of the portable device.

16. The portable device of claim 15, wherein the external edges of the portable device comprises corners of the portable device.

17. The portable device of claim 13, wherein the plurality of gas sensors comprises at least one gas sensor configured to detect a fluid flow indicative of a gas leak.

18. The portable device of claim 17, wherein the at least one gas sensor comprises a metal oxide gas sensor.

19. A device comprising:
a processor; and
a non-transitory computer-readable storage medium storing a program to be executed by the processor, the program including instructions for:
receiving, from a plurality of gas sensors, detection signals indicative of fluid flow_along a major surface of a portable device, the plurality of gas sensors being spatially arranged on the portable device and being exposed to an outside environment, the fluid flow having a direction and a speed, the plurality of gas sensors having respective mutual positions and distances between pairs of sensors in the plurality of gas sensors, the pairs of sensors comprising a first sensor and a second sensor in the pair of sensors;
determining, as a function of the detection signals, a first detection sensor in the plurality of gas sensors detecting the fluid flow prior to other sensors in the plurality of gas sensors;
determining time delays between detection of the fluid flow by the first sensor and by the second sensor in each pair of sensors in the plurality of gas sensors;
determining a fluid flow velocity vector indicative of the direction and the speed of the fluid flow as a function of the mutual positions and distances between the pairs of sensors in the plurality of gas sensors and the time delays; and
based on the determined fluid flow velocity vector, determining a parameter of a gas flowing along the major surface of the portable device.

20. The device of claim 19, wherein determining the time delays comprises calculating time cross-correlations between the detection signals of the pairs of sensors in the plurality of gas sensors.

* * * * *

UNITED STATES PATENT AND TRADEMARK OFFICE
CERTIFICATE OF CORRECTION

PATENT NO. : 11,187,563 B2
APPLICATION NO. : 16/227368
DATED : November 30, 2021
INVENTOR(S) : Fabio Passaniti Page 1 of 1

It is certified that error appears in the above-identified patent and that said Letters Patent is hereby corrected as shown below:

In the Claims

Claim 13, Column 13, Line 5; delete "fluid flow_ along" and insert --fluid flow along--.

Claim 19, Column 14, Line 12; delete "fluid flow_along" and insert --fluid flow along--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*